Jan. 16, 1934.  R. ERICSON  1,943,663
TILE BOARD AND METHOD OF MANUFACTURING SAME
Filed Oct. 30, 1929  5 Sheets-Sheet 1
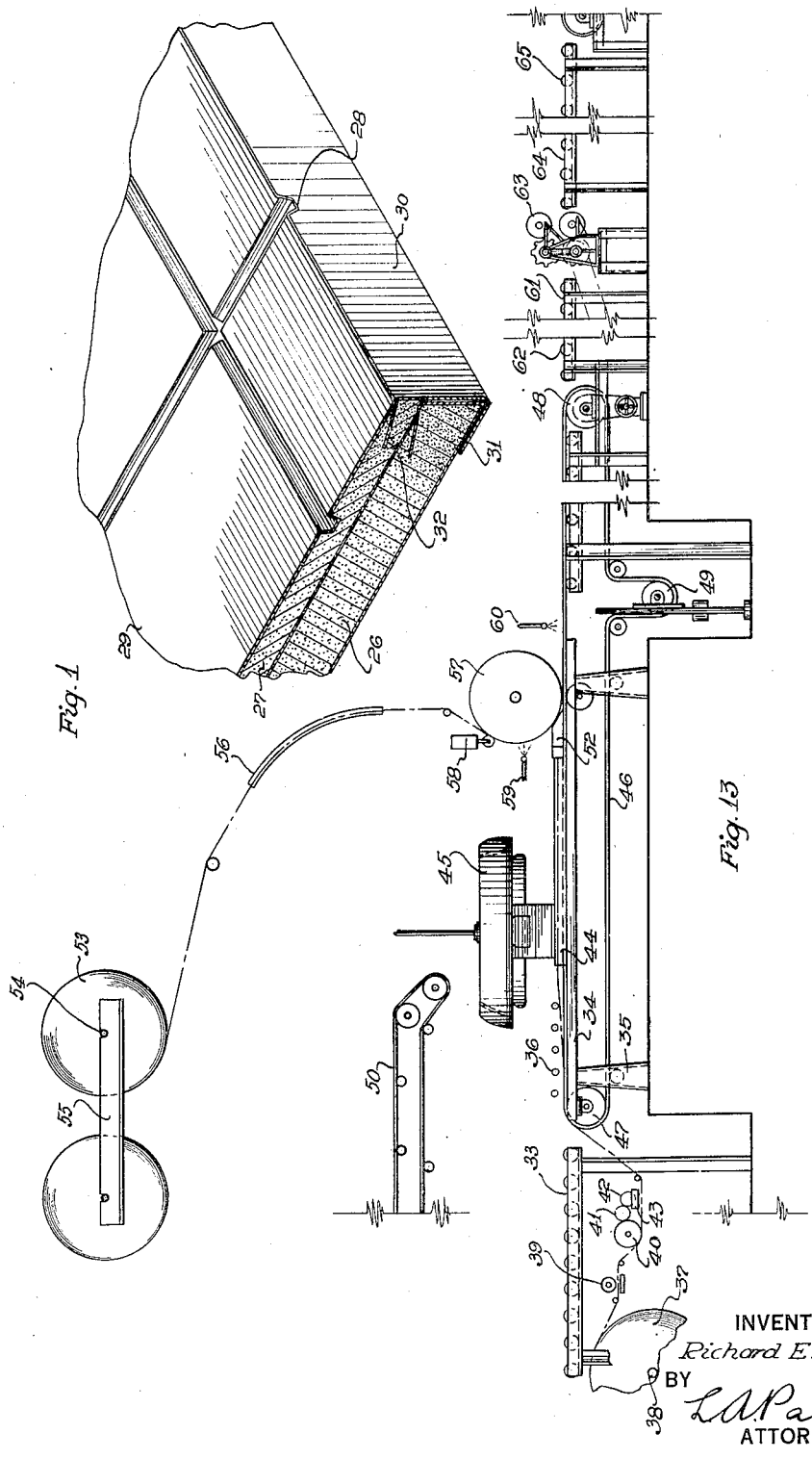
INVENTOR
Richard Ericson
BY
L.A. Paley
ATTORNEY

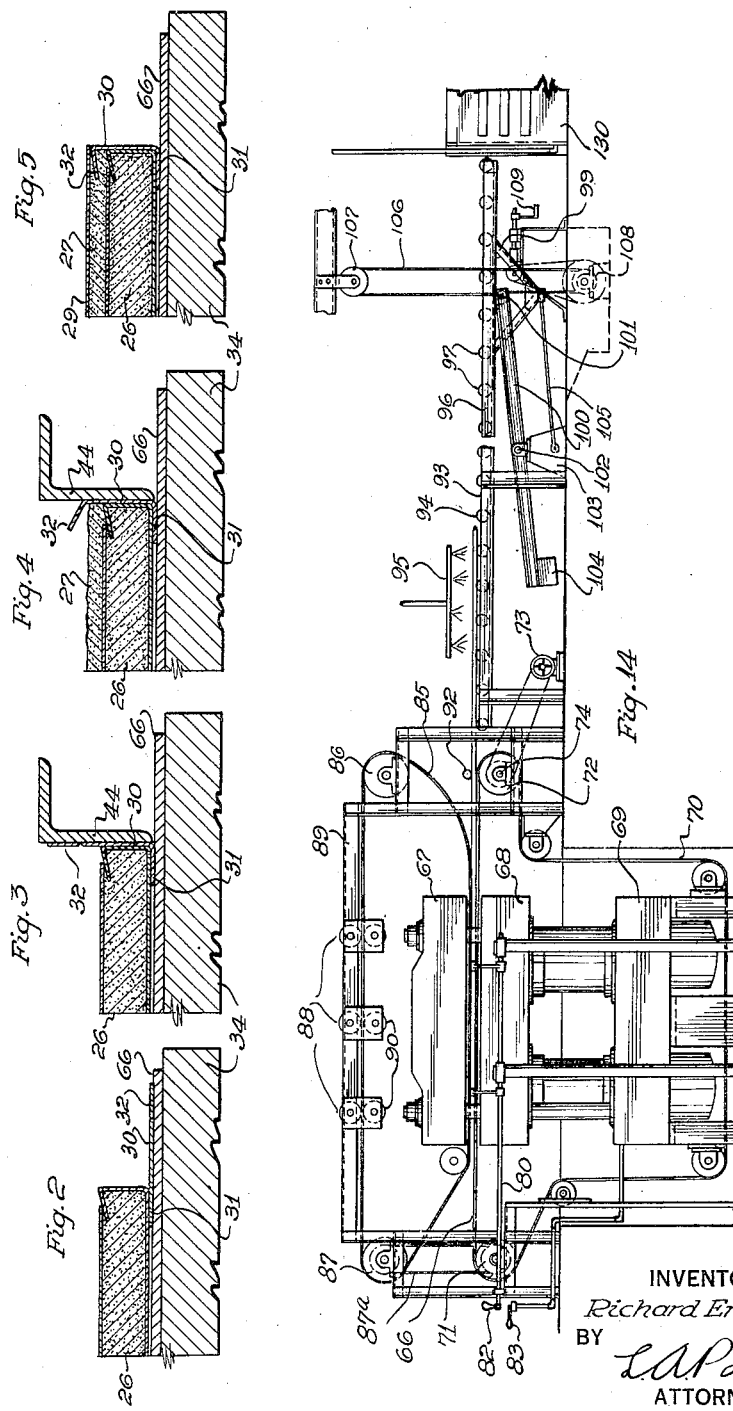

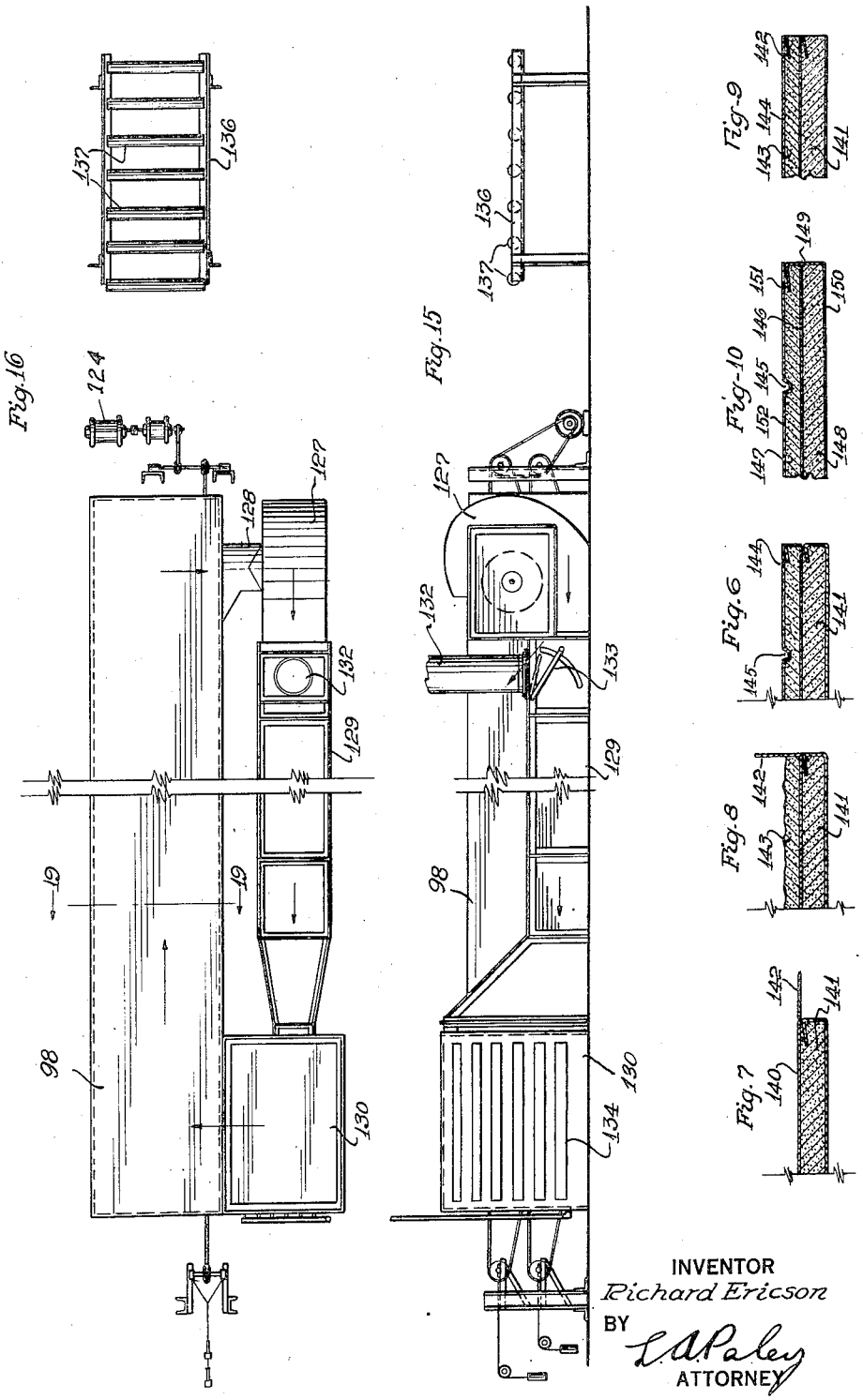

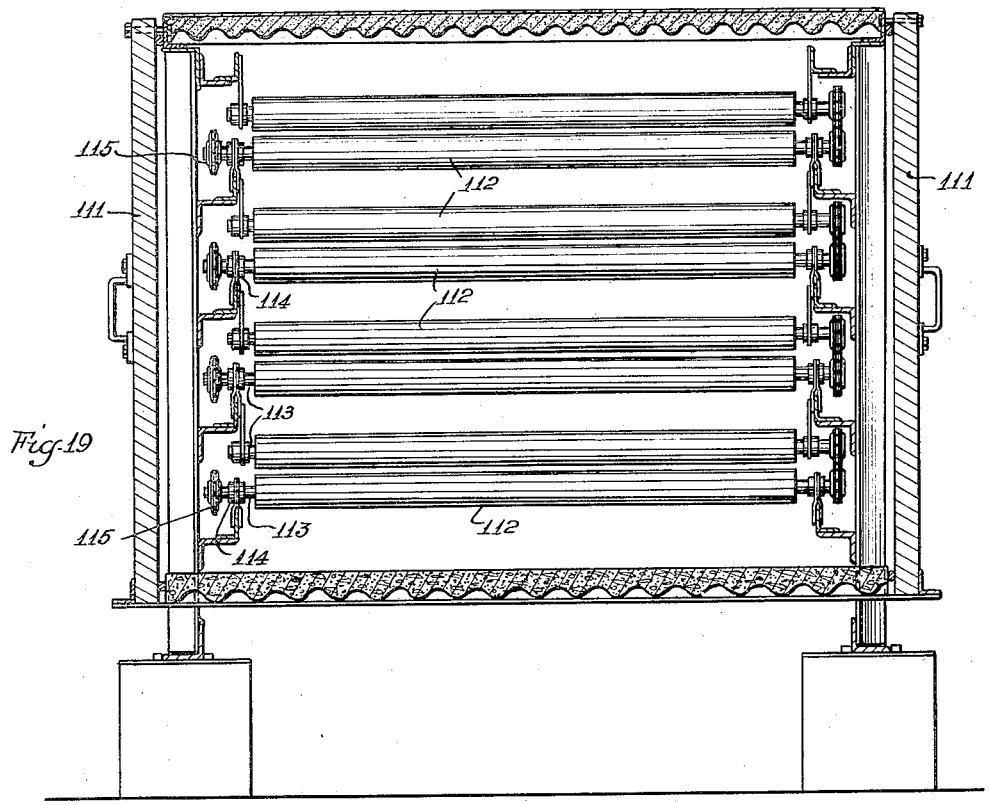
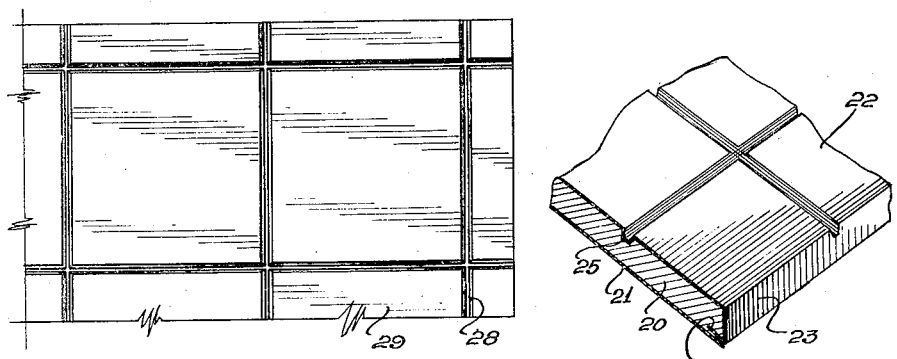

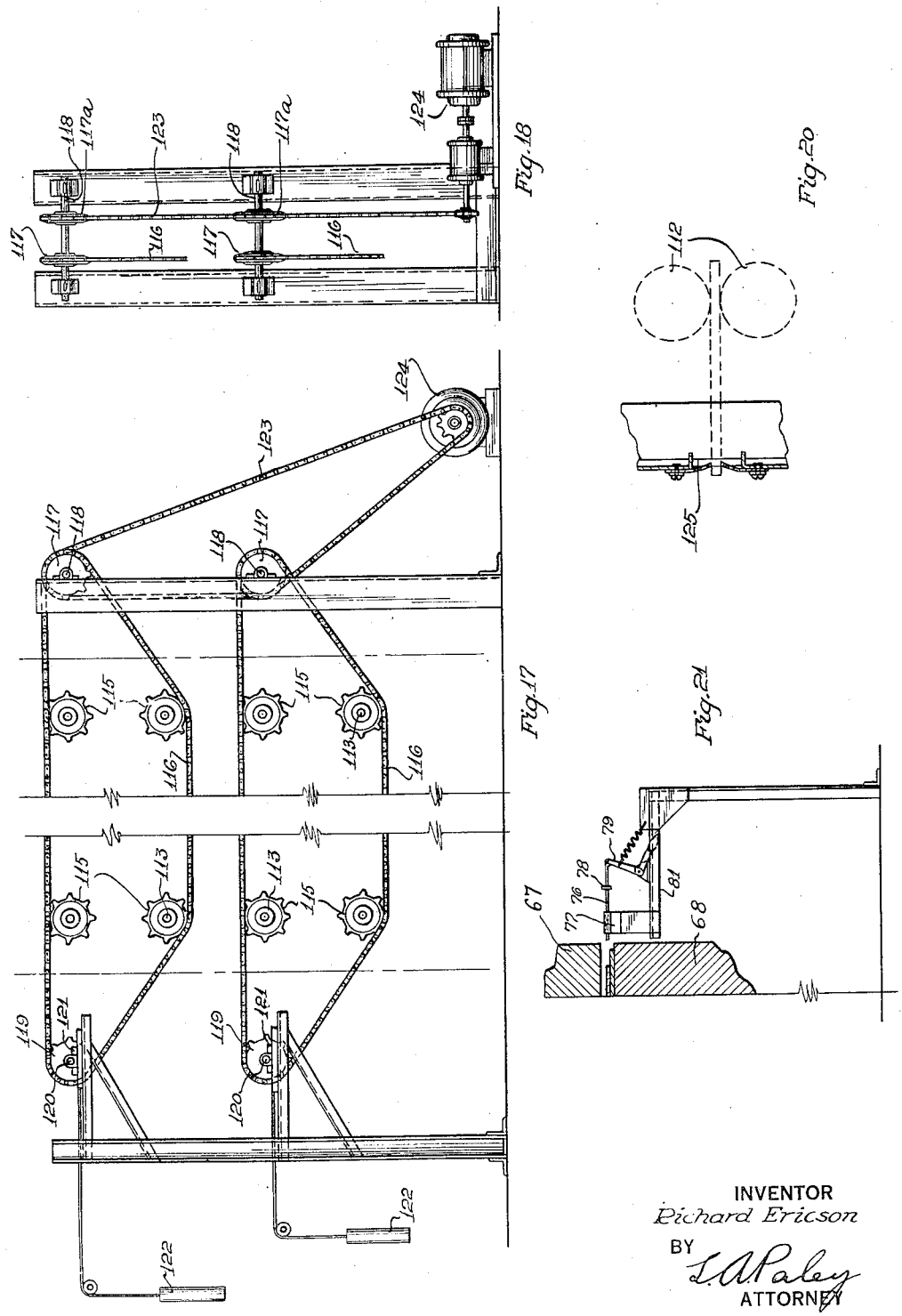

Patented Jan. 16, 1934

1,943,663

UNITED STATES PATENT OFFICE 1,943,663

TILE BOARD AND METHOD OF MANUFACTURING SAME

Richard Ericson, Chicago, Ill., assignor to United States Gypsum Company, Chicago, Ill., a corporation of Illinois Application October 30, 1929. Serial No. 403,387

12 Claims. (Cl. 154—2)

This invention relates to an ornamental board and a method of forming tile or other designs in plaster board. The invention further relates to an apparatus suitable for carrying out the above described method.

In my copending application, Serial No. 312,998, filed October 17, 1928, Patent No. 1,871,843, dated August 16, 1932, I have described the manufacture of a tile board in which an ordinary plaster board or wallboard is softened by the application of steam to the surface to be pressed, and then while hot, the tile impressions are pressed upon the heated and moistened surface of the board. While this method of manufacture produces a fairly satisfactory product, it has certain inherent difficulties in that when boards of considerable width are pressed, the boards will vary in thickness and the tile impressions on one part of the board will not be as deep as those on another part of the board. The core material is usually of a porous nature obtained by the mixing of foam in the plastic mixture before setting and the pressure applied to the board causes these minute cells to crush and leave a core which is comparatively weak and not resistant to rough handling. In manufacture, the core material unavoidably contains several voids next to the paper and on pressing such a board, the resilient rubber belt supporting the board presses up inwardly into these voids thus giving a rough surface on the back of the board which shows up all of the larger voids in the core material. At the bottom of a tile groove, the bond between the paper and the core material is destroyed so that the paper is not securely held onto the core and can be inadvertently torn away. I have also found that in the method of manufacture described, a very thick paper must be used on the top surface since otherwise the pressing operation has a tendency to break the paper fibers at the edges of the tile grooves, and make a rough and unsightly board.

An object of this invention, therefore, is to provide a method of manufacturing tile board in which the tile impressions are pressed upon the board while the core material is still in a plastic state during its initial manufacturing stage.

Another object of the invention is to provide a method of manufacturing tile board which will produce a product having a denser, stronger core, uniform impressions throughout the width of the tile board, a board with the paper securely bonded to the core at the bottom of the tile grooves, and a board in which a thinner paper can be used on the surface of same, without breaking the fibers during the pressing operation.

A further object of the invention is to provide a method of manufacturing tile board in which the back of the finished board will be perfectly smooth and pleasing to the eye.

A still further object of the invention is to provide an apparatus for carrying out my improved method; also to improve tile boards and their methods of and apparatus for manufacture in other respects hereinafter specified and claimed.

Reference is to be had in the accompanying drawings, forming a part of this specification, in which Fig. 1 is a perspective view of a portion of my improved tile board, made according to the method hereinafter described, Figs. 2 to 5, inclusive, are sectional elevations showing the board illustrated in Fig. 1 in the various stages of manufacture, Fig. 6 is a sectional elevation of a modified form of my tile board, Figs. 7 and 8 are sectional elevations of the tile board shown in Fig. 6 in different stages of manufacture, Fig. 9 is a sectional elevation of the tile board shown in Fig. 6 but with the edge trimmed true, Fig. 10 is a sectional elevation of a tile further modified form of tile board, Fig. 11 is a perspective view of a still further modified form of single-layer tile board, Fig. 12 is a plan view of the pressed surface of the tile board shown in any of the preceding figures, Fig. 13 is a diagrammatic sectional elevation of the feed end of the apparatus for manufacturing the improved tile board, Fig. 14 is an elevation of the pressing section of the apparatus, Fig. 15 is an elevation of the drying kiln and delivery end of the apparatus, Fig. 16 is a plan view of the drying kiln, Fig. 17 is an elevation of the driving mechanism for the rollers of the drying kiln, Fig. 18 is an end view of the driving mechanism for the drying kiln, Fig. 19 is a sectional elevation through the drying kiln, Fig. 20 is a fragmentary, partly diagrammatic, sectional elevation showing the arrangement at the delivery end of the drying kiln, and Fig. 21 is a sectional elevation of the mechanism for properly positioning the plaster board in the press.

One of the principal advantages of the plaster board described in the present application lies in the fact that the tile groove is pressed into the board before the plastic core material beneath the cover sheet has taken its final set. The simple form of the plaster board is shown in Fig. 11, and consists of a core material 20, which is covered on one face with a paper cover sheet 21, and on the opposite side by a paper cover sheet 22. The cover sheet 22 is provided with a fold 23 at the edge of the board, and this fold 23 is again folded inwardly to form a flap 24. The outer edge of the back cover sheet 21 overlies the flap 24 and is preferably secured thereto by an adhesive, not shown. During the initial stages of the manufacture of the board shown in Fig. 11, and before the plastic core material 20 has completely set, preferably between the initial and final sets thereof, tile grooves 25 are pressed into one of the cover sheets, such as the cover sheet 22, by an apparatus to be hereinafter described. This pressing operation densifies the core material and increases its strength. The pressing operation also improves the bond between the paper cover sheets 21 and 22 and the core material 20, and also insures a perfect bond between the paper at the bottom of the tile groove 25 and the core 20. The plaster board shown in Fig. 11 is made on a standard plaster board machine, as is well known in the art, and the tile grooves 25 or other ornamental designs, are pressed into the face thereof by a suitable pressing mechanism.

In the type of tile board shown in Fig. 1, it is contemplated that the base plaster board 26 be made in the ordinary way as that used for making the board shown in Fig. 11, and the board is preferably but not necessarily kiln dried prior to the application of a plastic coating 27 to one surface thereof. The plaster board 26 thus furnishes a firm, rigid base which does not break or crack when the tile grooves 28 are subsequently pressed into a paper cover sheet 29 on top of the unset plastic material 27. In the tile board shown in Fig. 1, a strip of paper 30 has inturned flap 31 adhesively secured to one face of the plaster board 26, and a second inturned flap 32 extending below, and preferably adhesively secured to the outer edge of cover sheet 29.

The apparatus for constructing the plaster board shown in Fig. 1, is illustrated in Figs. 13 to 21 inclusive, and includes a roller conveyor 33 upon which a workman places plaster boards 26 which are to form the base for the tile boards. From the conveyor 33, the plaster boards 26 pass onto a table 34 which is supported upon suitable standards 35. The paper strip 30 is unwound from a paper roll 37 which is rotatably supported on a shaft 38, and said strip is scored at the bend lines by means of scoring wheels 39. The adhesive is now applied to flap 31 by means of a paste-applying roll 40 which is in rolling contact with an idler roll 41 operating against a paste roll 42, the latter being rotatably mounted so as to dip into a paste or adhesive box 43. There are two rolls 37 for each tile board apparatus so that one strip 30 is applied to each edge of the tile board, the flaps being folded by suitable folding devices 44 in a manner well known in the art.

A mixing machine 45 of any standard design is mounted above the table 34 so as to deliver plastic material 27 onto the plaster boards 26 as they pass along said table. The movement of the plaster boards 26 along said table is accomplished by means of a belt 46 which passes under pressure rollers 36, around rollers 47 and 48 at the two ends of the machine, and around a belt tightener roller 49 which maintains tension in said belt 46, so that said plaster boards continually pass below said mixing machine 45 to receive the plastic coating 27. The plastic material is supplied to mixing machine 45 from a supply belt 50 leading from any suitable source of supply.

As the boards pass under the rollers 36, they are in the condition as shown in Fig. 2. The folding device 44 then turns the strips 30 and flaps 32 upwardly, as shown in Fig. 3, and the plastic material 27 is applied to the plaster boards 26 from mixer 45. The flap 32 is now turned inwardly by a folding device 52 so as to lie on top of the plastic material 27. The cover sheet 29 is unrolled from roll 53 which is suitably supported on a shaft 54 resting on framework 55. The paper sheet 29 passes downwardly about a curved guide 56 and around a head or master roll 57, so as to be applied to the top of the plastic material 27. A paste-applying device 58 is mounted adjacent each end of head roll 57 so as to apply paste to the outer edge of the cover sheet 29 thus causing the said edges of the cover sheet to be adhesively secured to flap 32. Steam jets 59 and 60 are located adjacent the head roll 57 so that steam is applied to both surfaces of the paper cover sheet 29 to soften the fibers of said cover sheet so that pressing of the tile grooves can later be accomplished without breaking said fibers.

When the double layer of plaster board leaves the conveyor belt 46, it passes onto a roller conveyor 61 having a series of positively driven rollers 62, said conveyor being of considerable length so as to give a time period of predetermined length, preferably such that the plastic material 27 has a chance to harden only slightly and become in condition so that the power cutoff device 63 can cut the boards into suitable lengths. After being cut into lengths, the boards pass along a roller conveyor 64 having a plurality of driven rollers 65, this conveyor being of sufficient length to permit a further hardening of the plastic layer 27 so that preferably the pressing operation of providing the top surface of the boards with tile grooves 28 is accomplished between the initial and final setting of the plastic material 27.

As the boards leave the conveyor 64, they pass onto a conveyor belt 66, the upper reach of which passes between upper fixed platen 67 and lower movable platen 68 of a hydraulic press 69 of standard design. The lower reach 70 of the belt 66 preferably passes through a suitable passage below the press 69, but if desired, both reaches of the belt 66 may be passed between the platens 67 and 68 as shown in my aforementioned copending application. The belt 66 passes around end pulleys 71 and 72, the latter of which is positively driven by means of a motor 73 so as to accomplish the continuous movement of said belt. This movement of the belt may be periodically stopped by the operator by actuating a clutch, not shown, on the shaft 74 which supports the pulley 72, so that the boards stop under the platen 67 in the proper position. The lower face of platen 67 contains the die ridges which form the tile grooves 28 in the paper cover sheet 29 and plastic material 27.

In order to properly position the boards laterally under the platen 67, a plurality of pusher rods 76 are slidably supported in bracket 77 adjacent each side of said platen 67 (see Fig. 21). A stop 78 is mounted on each rod 76 so as to engage the bracket 77 and limit the inward movement of said rods 76. The upper end of a lever 79 is pivotally secured to the outer end of each rod 76, and the lower end of said levers is secured to a rock shaft 80 which is rotatably supported in bearings secured to framework 81. An operating handle 82 is secured to the outer end of rod 80 in convenient position for actuation by the operator. A valve handle 83 is also positioned near the handle 82 so that the operator can open and close the press at will.

By reason of the fact that the upper cover sheet 29 has been thoroughly steamed and softened by steam pipes 59 and 60, the tile grooves 28 can usually be pressed into the cover sheet 29 without breaking the fibers along the upper edges of said tile grooves. However, in certain cases, when desired, a loose strip of fabric 85 may be arranged in the form of a continuous belt which passes between the cover sheet 29 and the upper platen 67. This belt of fabric or paper, or other elastic membrane, may pass around above the platen 67 about idler pulley 86 and pulley 87 which is preferably connected for rotation with pulley 71 by means of a suitable belt or chain 87a. Where this strip 85 is of paper, it may be used only once or may be used over and over again. In the latter case, rolls 88, which are rotatably supported upon a suitable framework 89, co-operate with lower rolls 90, similarly supported, to press out the grooves in said paper so that the strip may be re-used.

After the pressing operation, the tile boards are carried forward by belt 66 and pass under roller 92 which serves to flatten out any inequalities in the upper surface of the tile board. The tile board then passes onto a roller conveyor 93 having driven rollers 94, and a spray pipe 95 is located above said conveyor 93 so as to spray lacquer or other desired finishing or coating liquid onto the upper surface of the tile board to make a smooth and uniform coating thereon.

As the boards leave conveyor 93, they pass onto an elevating conveyor 96 having rollers 97, said conveyor 96 being adapted to introduce all boards into different levels of a multi-deck drying kiln 98 of standard design. The conveyor 96 is supported on a triangular framework 99 and on a tilting beam 100 which is pivotally connected to said framework by means of pivot pins 101. The beam 100 is pivotally supported intermediate its ends by a pivot pin 102 mounted on a base 103, a counterweight 104 being provided at the free end of beam 100 to counterbalance the weight of conveyor 96. A connecting rod 105 pivotally connects the apex of triangular framework 99 to the base 103 so that a parallel link motion is provided to maintain the conveyor 96 horizontal at all times, regardless of the height of same. A suitable cable 106 passes around pulleys 107 and 108, and an operating handle 109 is provided so that the vertical location of the conveyor 96 can be adjusted as desired, relative to the decks of kiln 98.

The kiln 98 consists of an elongated and insulated box 111 which encloses a plurality of rollers 112 arranged in pairs so as to form a plurality of decks in the kiln, and the plaster boards are delivered successively to different decks in the kiln so that all decks are maintained full of boards at all times. The rollers 112 are mounted on shafts 113 which are rotatably mounted in bearings 114, and sprocket wheels 115 are secured to the ends of shafts 113, said sprocket wheels being connected by suitable chains 116 which are arranged to pass over sprocket wheels 117 on counter shafts 118, and over sprocket wheels 119 mounted on shafts 120 which in turn are rotatably mounted in takeup bearings 121 operated by a weight 122 so as to maintain a uniform tension in the chains 116 at all times. A chain 123 connects additional sprocket wheels 117a on shafts 118 and is driven from a motor 124 to maintain a uniform travel of boards through the kiln 98. At the exit end of the kiln, flexible gaskets 125 are provided which bear against the upper and lower surfaces of the boards to maintain an airtight connection.

In order to cause a rapid current of unsaturated, heated air to pass through the kiln at all times, a blower 127 is provided which is connected on its suction side by a duct 128 to one end of the kiln 98 and at its discharge port, by a duct 129 to heater 130, the latter being directly connected to the end of the kiln 98 opposite the duct 128. A vent pipe 132 is provided on the duct 129 and its opening is controlled by a hand operated valve 133 so that a predetermined quantity of humid air is exhausted to the atmosphere at all times, and fresh air is admitted through controlled openings 134 on heater 130 so that the air passing through the kiln 98 is maintained in an unsaturated condition, thus insuring rapid drying of the tile boards. After the tile boards pass out from the kiln 98, they are preferably manually deposited upon a conveyor 136 or other suitable discharge point, said conveyor being provided with rollers 137. Instead of the conveyor 136, a bundling machine may be used to cause the boards to be bundled up in packages suitable for shipment to the consumer.

In the form of the board shown in Figs. 6, 7, and 8, the upper cover sheet 140 of the boards 141 is extended to form a flap 142 which is bent upwardly to include a plastic layer 143, and then a cover sheet 144 is applied to the plastic layer 143 before said plastic layer has completely set to solid form. The tile grooves 145 are then pressed into the cover sheet 144 and plastic layer 143 in a manner as previously described for other types of boards. In the type of board shown in Figs. 6 to 8, inclusive, it is contemplated that the lower board 141 be manufactured only a few minutes in advance of the application of the plastic layer 143 so that said plastic layer will be applied to the freshly prepared board 141 which has not been dried but has sufficient rigidity to form a support during the subsequent pressing operation. By a suitable rearrangement of the manufacturing apparatus, this type of board may be easily constructed.

In the type of board shown in Fig. 10, the intermediate paper sheet 146 between upper plastic layer 147 and lower plastic layer 148 has no outstanding flap, but a flap 149 is provided on the lower cover sheet 150, said flap 149 being turned inwardly to form flap 151 which lies on top of the plastic layer 147. The cover sheet 152 is then applied to the top of plastic layer 147 and flap 151 in a manner as hereinbefore described. The type of board as shown in Fig. 6 is especially suited for finishing by trimming the edge to form a finished board as shown in Fig. 9. In this way, the board can be made slightly wider than described and the edge finished perfectly true by sawing, shearing or otherwise, to produce a board of exact width and smooth edge. If desired, the paper sheet 146 shown in Fig. 10 may be completely omitted and the gypsum composition forming the lower layer 148 may be provided with accelerator, such as hydrated gypsum, to increase the rate of setting and the upper layer 147 provided with retarder, such as that made from animal matter, to retard the rate of setting and maintain said plastic layer 147 in a semiplastic condition until the pressing operation can be performed.

In the operation of forming the board shown in Fig. 1, the boards are fed over the roller conveyor 33 onto belt 46 where the flaps 31 of strips 30 are adhesively attached to the bottom outside edges of said boards, and the plastic layer 27 is then applied to the upper surface of board 26 from mixer 45. The flaps 32 of strips 30 are then turned inwardly over the plastic layer 27 by folding devices 44 and 52, and the top cover sheet 29 is applied, being unwound from roll 53 around guide 56 and head roll 57. Paste is applied to the outer edges of cover sheet 29 by means of pasting device 58 and both surfaces of sheet 29 are steamed by steam jets 59 and 60 arranged adjacent head roll 57.

The boards now pass from belt 46 onto setting conveyor 61 and then through cutting shears 63 which cut the board into suitable lengths. The cut boards then pass along conveyor 64 to belt 66 which conveys the boards between the platens 67 and 68 of press 69. The lateral position of the board under the platen 67 is then adjusted by actuating handle 82 which causes the pusher rods 76 to position the boards correctly relative to said platen. Valve handle 83 is now actuated by the operator to close the press and cause the tile grooves 28 to be imprinted on the top surface of the board. The press 69 is opened and the motion of belt 66 is then continued so that the boards pass outwardly from the press under smoothing roller 92 and onto conveyor 93 where the upper surface of the tile boards is sprayed by a liquid coating composition from spray pipe 95. The tile boards pass from conveyor 93 onto elevating conveyor 96 which operates by a parallel link motion to deliver the boards into different decks of the drying kiln 98. The decks in the drying kiln 98 are formed by the rollers 112 which are arranged in pairs and are driven positively so as to cause the steady movement of the boards through said drying kiln. A rapid current of heated air is caused to pass continuously through the drying kiln by means of blower 127, some of the humid air being vented out of duct 132, and the remaining air passing through heater 130 at one end of the kiln and out thru the other end of the kiln through duct 128 to the blower 127. The finished boards are laid on conveyor 136 and may be packed or bundled ready for shipment.

I would state in conclusion that while the illustrated examples constitute practical embodiments of my invention, I do not wish to limit myself precisely to these details, since manifestly, the same may be considerably varied without departing from the spirit of the invention as defined in the appended claims.

Having thus described my invention, I claim as new and desire to secure by Letters Patent:—

1. The method of manufacturing tile board which comprises advancing a plaster board, applying a plastic material to one surface thereof, moistening and heating a cover sheet and applying said cover sheet to said plastic material, and pressing an ornamental groove into said cover sheet and plastic material by the application of pressure.

2. The method of manufacturing tile board, which comprises forming a tile board having a plurality of cementitious layers of different hardness and separated by a fibrous sheet and forming a groove in one of said layers of material by the application of pressure a substantial time after the formation of said board and before the complete setting of the cementitious material.

3. The method of manufacturing tile board which comprises advancing a preformed plaster board, applying a plastic material to one surface of said plaster board, steaming a cover sheet and applying said cover sheet to the plastic material, and forming an ornamental groove in said steamed cover sheet and plastic material by the application of pressure.

4. The method of manufacturing tile board which comprises forming a layer of semiplastic cementitious material, steaming a fibrous cover sheet, applying said cover sheet to said semiplastic material, and forming an ornamental groove in said cover sheet and plastic material by the application of pressure before permitting said plastic material to set to final hardness.

5. The method of manufacturing tile board which comprises forming a semiplastic cementitious material into a layer, applying a fibrous cover sheet to said layer, permitting said plastic material to partially set for a substantial period after the formation of the board, and forming an ornamental groove in said cover sheet of plastic material by the application of pressure.

6. The method of manufacturing ornamental board, which comprises applying fibrous strips to preformed plaster boards, applying a cementitious material in semiplastic form to said plaster board, folding the strips about said plastic material, applying a cover sheet to said plastic material, and forming an ornamental groove in said cover sheet and plastic material by the application of pressure, before the plastic material has completely set to solid form for a substantial period after the formation of the board.

7. The method of manufacturing an ornamental board which comprises forming a cementitious material into a layer having a fibrous cover sheet, permitting said cementitious material to partially set, applying a flexible membrane to the outer surface of said cover sheet, pressing an ornamental groove into said cover sheet through said membrane by the application of pressure and removing said membrane.

8. The method of manufacturing ornamental board, which comprises forming a plastic cementitious material into a layer, applying a cover sheet to said layer, forming an ornamental groove in said cover sheet and plastic material by the application of pressure a substantial period after the formation of the board, permitting said cementitious material to set into solid form, and trimming the edges of the resulting ornamental board.

9. A tile board comprising a cementitious core material having fibrous cover sheets, one of said sheets being provided with an ornamental design pressed into said cover sheet, and a sheet of fibrous material between said cover sheets and secured to one of said cover sheets and dividing said core material into a plurality of independent layers.

10. A tile board comprising a cementitious core material in the form of a flat slab divided by a sheet of fibrous material into a plurality of independent layers, fibrous cover sheets on each face of said slab and folded about the edges thereof, said intermediate sheet being secured to one of said cover sheets, one of said fiber sheets being provided with an ornamental impression.

11. The method of manufacturing ornamental boards from plaster boards having fibrous cover sheets separated by a cementitious core material, which comprises positioning plaster board between the platens of a press, interposing a separable, flexible sheet between a pressing platen and the board, pressing an ornamental design through said flexible sheet into one of the fibrous cover sheets of said board, removing the board from the press, and separating the flexible sheet from the cover sheet of said board.

12. The method of manufacturing tile board, which comprises advancing a plasterboard, applying a plastic material to one surface of said plasterboard, applying a cover sheet to said plastic material, allowing the plastic material to set for a substantial period, and pressing an ornamental groove in said cover sheet and plastic material by the application of pressure before the complete setting of said plastic material.

RICHARD ERICSON.